(12) United States Patent
Lavedas

(10) Patent No.: US 11,990,674 B2
(45) Date of Patent: *May 21, 2024

(54) ADJUSTMENT OF NEAR-FIELD GRADIENT PROBE FOR THE SUPPRESSION OF RADIO FREQUENCY INTERFERENCE AND INTRA-PROBE COUPLING

(71) Applicant: Thomas Lavedas, Bristow, VA (US)

(72) Inventor: Thomas Lavedas, Bristow, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,047

(22) Filed: Aug. 8, 2022

(65) Prior Publication Data

US 2023/0034059 A1 Feb. 2, 2023

Related U.S. Application Data

(63) Continuation of application No. 16/985,795, filed on Aug. 5, 2020, now Pat. No. 11,431,090, which is a continuation of application No. 15/802,790, filed on Nov. 3, 2017, now Pat. No. 10,756,425.

(60) Provisional application No. 62/417,184, filed on Nov. 3, 2016.

(51) Int. Cl.
*H01Q 7/00* (2006.01)
*H01Q 1/52* (2006.01)
*H01Q 7/08* (2006.01)
*H04B 5/00* (2006.01)
*H01Q 1/22* (2006.01)

(52) U.S. Cl.
CPC ............... *H01Q 1/525* (2013.01); *H01Q 7/08* (2013.01); *H04B 5/00* (2013.01); *H01Q 1/2216* (2013.01)

(58) Field of Classification Search
CPC .......... H01Q 1/2216; H01Q 1/22; H01Q 1/52; H01Q 1/525; H01Q 7/00; H01Q 7/08; H01Q 11/12; H04B 5/00; H04B 5/0031; H04B 5/0087; C25D 17/00; C25D 17/001; C25D 17/06; C25D 21/12; G05B 19/4189; G05B 2219/5031; H01L 21/67778; H01L 21/681; H01L 21/67766
See application file for complete search history.

(56) References Cited

U.S. PATENT DOCUMENTS

| | | | |
|---|---|---|---|
| 2,740,114 A | 3/1956 | Adams | |
| 2,954,538 A | 9/1960 | Horgan | |
| 3,683,389 A | 8/1972 | Hollis | |
| 4,312,003 A * | 1/1982 | Robbins, Jr. ............. | H01Q 7/08 343/788 |

(Continued)

*Primary Examiner* — Tho G Phan

(74) *Attorney, Agent, or Firm* — Wolter Van Dyke Davis, PLLC; Eugene J. Molinelli; John L. DeAngelis

(57) ABSTRACT

A sensor probe with reduced coupling between the various antenna elements and suppression of radio frequency interference. In one embodiment the sensor probe comprises a first antenna and a second antenna. A first and a second decoupling loop is electrically connected to one of the first and second antennas with current flow in opposite directions in the first and second decoupling loops. A third decoupling loop is electrically connected to another one of the first and second antennas and physically disposed between the first and second decoupling loops. Coupling between the first and second antennas is responsive to a location of the third decoupling loop relative to the first and second decoupling loops.

18 Claims, 10 Drawing Sheets

(56) References Cited

U.S. PATENT DOCUMENTS

| | | | |
|---|---|---|---|
| 4,429,314 A * | 1/1984 | Albright | H01Q 19/09 |
| | | | 343/788 |
| 4,691,208 A | 9/1987 | Stern et al. | |
| 4,788,624 A | 11/1988 | Strange | |
| 5,041,791 A | 8/1991 | Ackerman et al. | |
| 5,602,556 A | 2/1997 | Bowers | |
| 5,712,566 A | 1/1998 | Taicher et al. | |
| 6,529,169 B2 | 3/2003 | Justice | |
| 7,034,767 B2 * | 4/2006 | Karlsen | H01Q 7/08 |
| | | | 343/788 |
| 7,714,791 B2 | 5/2010 | Lavedas | |
| 7,755,552 B2 | 7/2010 | Schantz et al. | |
| 7,903,041 B2 | 3/2011 | Levan | |
| 8,717,242 B2 | 5/2014 | Lavedas et al. | |
| 9,484,632 B2 | 11/2016 | Lavedas | |
| 9,819,097 B2 * | 11/2017 | Kerselaers | H04B 5/0087 |
| 9,882,250 B2 | 1/2018 | Chappelle et al. | |
| 10,311,353 B1 | 6/2019 | Diorio et al. | |
| 10,756,425 B2 * | 8/2020 | Lavedas | H04B 5/00 |
| 10,903,573 B2 * | 1/2021 | Kaverine | H01Q 7/08 |
| 11,482,785 B2 * | 10/2022 | Lasko | H01Q 7/08 |
| 2004/0124840 A1 | 7/2004 | Reykowski | |
| 2015/0372395 A1 | 12/2015 | Lavedas | |
| 2017/0250469 A1 | 8/2017 | Robert et al. | |
| 2020/0150201 A1 | 5/2020 | Dornberger et al. | |

* cited by examiner

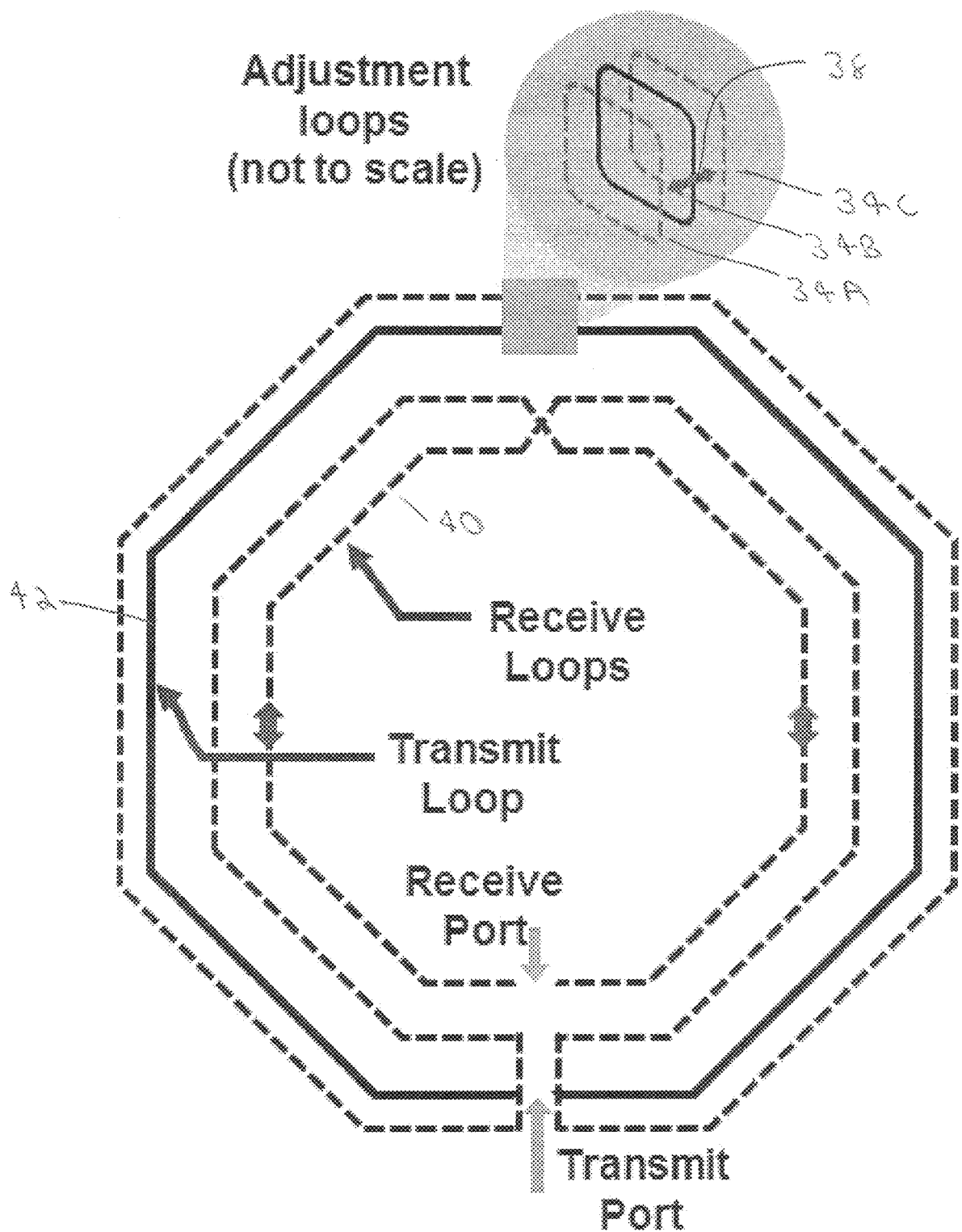

ADJUSTMENT OF NEAR-FIELD GRADIENT PROBE FOR THE SUPPRESSION OF RADIO FREQUENCY INTERFERENCE AND INTRA-PROBE COUPLING

CROSS-REFERENCE TO RELATED APPLICATIONS

The present application claims priority as a divisional application to the application filed on Aug. 5, 2020, assigned application Ser. No. 16/985,795, and entitled Improved Adjustment of Near-Field Gradient Probe for the Suppression of Radio Frequency Interference and Intra-Probe Coupling, now U.S. Pat. No. 11,431,090, which claims priority as a continuation application to the application filed on Nov. 3, 2017, assigned application Ser. No. 15/802,790, and entitled Improved Adjustment of Near-Field Gradient Probe for the Suppression of Radio Frequency Interference and Intra-Probe Coupling, now U.S. Pat. No. 10,765,425, which claims priority under Section 119(e) to the provisional application filed on Nov. 3, 2016, assigned application No. 62/417,184, and entitled Adjustment of Near-Field Gradient Probe for the Suppression of Radio Frequency Interference and Intra-Probe Isolation, which is incorporated herein in its entirety.

FIELD

At least some embodiments described herein may relate to RF circuits, probe structures, antenna systems, and related techniques and methods to improve far-field noise suppression (i.e., increase suppression of far-field noise that impinges a probe circuit) and improve intra-probe isolation in part or all of these devices, using electrically adaptive structures, methods, and techniques, as well as systems, methods, and devices for improving near-field sensing applications, such as explosive detection and RFID systems.

BACKGROUND

Antenna systems have near-field and far-field radiation regions. The near-field is a region near an antenna where the angular field distribution depends upon the distance from the antenna. The near-field is generally within a small number of wavelengths from the antenna and is characterized by a high concentration of energy and energy storage in non-radiating fields. In contrast, the far-field is the region beyond the near-field, where the angular distributions of the fields are essentially independent of the distance from the antenna. Generally, the far-field region is established at a distance of greater than $D^2/\lambda$ from the antenna, where D is an overall dimension of the antenna that is large compared to wavelength $\lambda$, the wavelength of the radiating signal. Generally, antenna radiation or the radiating signal are considered to propagate in the far-field region as a plane wave.

Antennas used to create and exploit the energy in their near-field are found useful in RFID, nuclear magnetic resonance (NMR), quadrupole resonance (QR), resonant power transmission and other applications. Used in this manner, these antennas may commonly be referred to as sensor probes. For example, some Radio Frequency Identification (RFID) systems use near-fields for communications between the RFID transponder tag and the RFID interrogator, and the energy stored in the near-field may also provide the power to drive a microchip embedded in a passive RFID transponder tag. RFID systems are typically wireless, non-contact systems that use radio frequency electromagnetic fields to transfer information from an RFID card or transponder tag to a reader or interrogator for the purposes of automatic identification and/or tracking of the item to which the tag is attached.

At least some known explosive detectors and RFID systems use loop-type radiators (i.e., a loop-type transmitting antenna) for the interrogator or transmitting antenna, for example, an antenna consisting of a figure-eight shaped conductor, to reduce the creation of energy in their far-field regions. That is, loop antenna systems can be designed such that the coupling between the antenna and its nearby surroundings (i.e., the near-field) is relatively high, whereas the coupling between the antenna and its distant surroundings (i.e., the far-field) is minimized. Since the near-field energy is most important for sensor probes, such as the probe of the present invention, a minimal far-field energy is acceptable.

To minimize the far-field energy, two or more loops are used in combination, where the loops may have a specific size and geometry, such that the magnitude and direction of the current within the loops generate fields that cancel each other out in the far-field region (that is, the vector sum of the fields created from each of the antenna loops is close to zero.) But generally, as applied to the present invention, the structure of the far-field developed by energy emanating from the transmit antenna is of little concern and thus there is no need to suppress the transmission of the far-field energy.

In a reciprocal fashion, when using the loop antenna system as described above in a receiving mode, energy emanating from the far-field region induces voltages in the loops that are equal in magnitude, but opposite in polarity, such that they sum to zero at the output terminals of the receiving antenna, while the reception of near-field signals is little affected. This far-field suppression is a desirable feature in an antenna for use in sensor probes, such as explosive detectors and RFID systems.

One application for near-field sensor probes (including those using loop-type radiators as described above) is in a detection system used to exploit a material's Nuclear Quadrupole Resonance (NQR), where NQR is a radio frequency (RF) spectroscopic technique that serves as the basis for a system to detect and identify a wide range of materials based on detection of the resonances associated with their quadrupolar nuclei. The energy transmitted from a near-field probe excites this resonance in a material exhibiting this NQR resonance characteristic. The material then radiates a response signal, which must be detected by the probe's receiving antenna in the presence of radio frequency interference (RFI) in the environment and typical Gaussian noise in the receiver. The NQR response signal provides a unique signature of the material of interest that indicates the presence of quadrupolar nuclei in the radiated material. Exemplary uses for NQR detection include (but are not limited to), screening of airline baggage, parcel screening, detection of drugs/narcotics, and detection of explosives, such as detection of buried Improvised Explosives Devices.

One drawback with systems that use near-field probes and related technologies, especially for detection and screening of explosives, is the need to operate in the presence of significant RFI especially far-field RFI. Therefore, some means of suppressing this interference without significantly degrading near-field performance is required. Systems for suppressing far-field RFI are known and at least one is described above (far-field radiation that generates opposite-polarity voltages that cancel) but the components involved are subject to manufacturing variations and tolerances that limit their effectiveness.

Suppression of RFI is particularly relevant for NQR systems, because the responses are relatively weak signals in segments of the RF spectrum occupied by high-power radio stations and subject to significant man-made and atmospheric noise sources. Detection of NQR signals, using a near-field probe (antenna) such as a loop antenna, can be difficult in the presence of strong far-field noise sources/signals, such as AM radio transmitters, and nearby noise sources/signals, such as automobile ignitions, fluorescent lighting, computers, mobile phones, and other electronics devices.

The presence of strong far-field noise sources/signals presents a difficulty that arises at least in part because these kinds of noise sources can create substantial coherent and non-coherent geographically distributed noise that can be within the detection frequency ranges of interest. For example, detection of land mine explosives such as tri-nitrotoluene (TNT) can be affected by amplitude modulation (AM) radio signals sourced in the far-field, because the characteristic detectable frequencies associated with TNT (used in NQR detection systems) are below 1 MHz, which is within the standard AM radio band.

It is desirable to suppress RFI emanating from distant sources, so that this RFI does not interfere with detection of the desired signal. Some known implementations that attempt to suppress RFI use a single sensor probe to implement both transmit and receive functions, augmented with a remote RFI sampling antenna (which will sense all energy in its vicinity, but is conventionally placed at a location where it will be less sensitive to the desired target's response to near-field energy) coupled to a weighted negative feedback loop to cancel the RFI and thereby reduce probe susceptibility to RFI. Such a system is referred to as an active cancelation network. This kind of implementation can introduce undesirable performance compromises that can lead to performance degradations. In particular, the desire to maximize the efficiency of the receive function works in opposition to the desire to limit the time it takes for the transmit energy in the probe to dissipate after the transmit pulse has ended. That is, it is preferable to limit the coupling between the transmit and receive energy in the probe. In fact, overall system performance is further improved by separating components associated with the transmit and receive functions so that each can be optimized for its specific function.

Additionally, the effectiveness of a remotely located sampling antenna is limited because the distributed nature of the RFI causes signals that are acquired from locations different from the location of the sensing probe to vary significantly in ways that cannot be fully compensated for by adjusting the phase and amplitude of the signal derived from the sampling antenna.

Specifically, the response from the remote sampling antenna(s) does not exactly match the response derived from the sensor probe. Outside of a narrow frequency band, the responses will differ in one or both of amplitude and phase. Use of remote sampling antennas can also impose stringent linearity requirements on the active components of the probe system, that is, the first stage of amplification (e.g., a low-noise amplifier (LNA)) to assure the desired response signal is not lost because of saturation of the amplifier before the RF-interference cancelation processing stage.

Still other implementations may incorporate shielding over some or all of the probe in an attempt to reduce RFI; this is more common with larger resonant probes, and can result in bulky probe configurations. Further, such shielding is best suited for detection of buried threats, but is much less effective in personnel screening applications.

Several previously patented inventions (U.S. Pat. No. 8,717,242 B2, U.S. Pat. No. 7,714,791 B2) and a published patent application of a pending application (US 20150372395 A1) by the current inventor have described means of suppressing RFI using a set of properly connected and properly sized, collocated loops. Specifically, two or more smaller loops are collocated at the center of a larger loop such that the total area of the smaller loops equals the area of the larger loop. The smaller loops are connected to the larger loop such that the voltage induced in the smaller loops by any RF interference sourced at a distance, that is in the far-field, is equal and opposite in polarity to the voltage induced in the larger loop. Thus, the interconnection of the loops acts to minimize the voltage developed due to far-field radiation impinging on the small and large loops.

However, fields generated in the near proximity of the loops (near-field radiation) do not induce equal voltages in the various loops. Specifically, the voltage induced by fields generated by sources near the larger loop is significantly less than the voltage generated in the smaller loops. For this reason, this combination of loops is seen to be a very effective means of sampling fields nearby, while rejecting fields sourced from substantially greater distances.

But, to maximize rejection of the far-field sourced interference the geometry of the loops must be carefully and accurately controlled to maintain proper size and alignment conditions. Manufacturing tolerances and nearby environmental conditions can compromise the RFI suppression due to these geometrical anomalies. Prior art techniques have demonstrated various means, both mechanical and electrical to maintain geometrical features and thereby maximize the suppression effect. Mechanical approaches are best suited for onetime adjustments or require complicated electromechanical actuators to provide automated control. Previously described electrical techniques, while suitable for automation, are complicated to implement.

SUMMARY

The following presents a simplified summary in order to provide a basic understanding of one or more aspects of the embodiments described herein. This summary is not an extensive overview of all of the possible embodiments, and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

To minimize coupling between the transmitted energy and the received energy in the sensor probe, one exemplary implementation of the invention described herein adds three small loops (referred to a first, second, and third decoupling loops and smaller in size than the probe loops that comprise the sensor) to the probe to enable an alternative coupling adjustment. The first and second decoupling loops are connected to one of the probe loops (Circuit 1, say, the receive portion of the sensor probe) such that the current flows in the opposite clockwise sense in each of these loops and the third loop is connected to the other part of the probe (Circuit 2, say, the transmit portion). Moving the third loop, placed between the first and second loops, varies coupling between Circuit 1 and Circuit 2 (i.e., between the receive and transmit portions of the probe). Properly adjusted, this coupling variation is used to counteract any residual coupling between the larger (i.e., relative to the decoupling loops)

probe loops (i.e., the transmit and receive loops of the probe), thereby maximizing the isolation between Circuits 1 and 2.

In another embodiment of the present invention, the decoupling effect is implemented using specially configured ferrite-loaded rods to adjust the effective sizes of one or more of the several near-field probe loops such that the need for mechanical adjustments of the probe loops is minimized or even eliminated. Each ferrite-loaded rod operates as a voltage-controlled variable inductive coupler.

Specifically, in this embodiment, the ferrite rod is fabricated with a hole passing through its long axis. A control winding comprises several turns and a segment of each turn is disposed within this hole such that it effects a change in the relative permeability of the ferrite material when a suitable current is applied to the control winding. Although current-control of the magnetic properties of an inductor's core material is known, the present invention uses current to control properties of a rod-shaped core. According to the prior art, current-control of inductive properties was carried out with inductors/transformers having a closed-form core.

Applying a second winding and a third winding of one or more turns circumferentially around the ferrite rod, normal to the control winding, creates an inductive element that also acts as a transformer whose coupling is adjustable through the use of a control current (i.e., the current passing through the control winding). The second and third windings disposed circumferentially around the rod are coupled electrically, while the control winding is isolated from these windings by virtue of the imposed orthogonal geometry of the control winding relative to the second and third windings.

Two such transformers are required to create both positive and negative values of mutual inductance to provide full control over the mutual coupling. The two transformers are identical, except for the direction of current flow in the two "primary" coils, i.e., the circumferential windings. Using two such transformers properly interconnected allows effective coupling between two probe circuits (i.e., the probe transmit antenna and the probe receive antenna) to be varied as a means of countering any residual coupling due to mechanical or environmental variations present in the transmit and receive probe loops.

As can now be appreciated, there are two distinct adjustment problems associated with the probe design: primarily, RFI suppression, secondarily, isolation between transmit and receive functions. However, in one embodiment each problem is addressed through the use of the "controlled" ferrite rod transformers i.e., inductive elements that are described herein. Thus, in one embodiment, four such ferrite rod antennas are used to address both the RFI suppression and isolation problems.

In a third embodiment, only a single winding is applied to the circumference of a ferrite rod. In this configuration, the assembly acts as a small antenna (as compared to the inductive coupler or transformer embodiment described above), which may be referred to as a rod antenna or a loop antenna. That is, the antenna produces an output voltage when an RF field is present, or conversely a field is produced around it when an RF current is passed through the circuit. The control winding is added to control the permeability of the ferrite rod or core. The control winding is wound through a hole passing through the ferrite rod, while the circumferential winding is placed around the rod at a right angle to the control winding. This unique configuration enables easy control of the rod's permeability because the control flux flows in a closed path through the ferrite.

Having the ability to vary the relative permeability of the rod antenna provides an electronic means of adjusting the effective area of the probe loop antennas. When inserted in series with one of the loops of the near-field probe, the effective size of the loops is obtained. Specifically, when the control current is low or zero, the relative permeability of the ferrite rod is high, which in turn increases the effective area of the circumferential winding that is wound around the rod. When the control current is increased the permeability is reduced, which in turn reduces the effective area of the loop around the rod. Control of the received RF interference is thereby achieved by measuring the total noise energy impinging on the complete probe, in the absence of the desired signal, and then adjusting the control current, and thereby the relative signal contributions of the one or more loops that constitute the antenna probe, until the noise is minimized.

Generally, two rods and their respective windings are preferred to both reduce the coupling between the transmit and receive probe loops, and minimize the effects of far-field RFI. In one embodiment, the inventor suggests the use of four rods and their respective windings to assure that the probe antennas remain balanced relative to ground, as this is an important consideration to achieve maximum RFI suppression.

In a similar manner, a relative size of the receive antenna of the probe can be adjusted relative to the transmit portion. That is, a second rod antenna or set of rod antennas can be added to the second loop (e.g., either the transmit loop or the receive loop) to adjust its effective size relative to the other loop(s) in the probe in such a manner as to control the residual coupling between the two antennas of the probe. By applying a signal to one loop of the probe, while measuring the output from the second loop, a feedback situation is created so that controlling the current in the control loop of one or more of the rod antennas minimizes any residual coupling by purely electronic means.

In yet another embodiment, a complete sensor probe is constructed using current-controlled ferrite rod antennas, in lieu of the relatively large air-cored transmit and receive antenna probe loops. Each ferrite rod loop antenna is configured to exhibit the equivalent area of the large air-core loops that it replaces by selecting the necessary ferrite core material, length and diameter and by applying the appropriate number of conductor turns. In addition, two of these ferrite-loaded loops are spaced apart with a third loop centered between them. The two outer loops are constructed such that the sum of their effective areas is exactly equal to that of the center loop. The two outer ferrite loaded loops are connected in such a manner as to have their outputs sum and in turn connected to oppose that of the inner loop. In this way, an RFI suppressing probe (i.e., suppressing plane waves or RF waves from the far field) is created. Note that these three ferrite rods can be used to cancel plane waves that are received by the three ferrite rods (i.e., when operating as a receive antenna) or to cancel plane waves that are transmitted by the three ferrite rods (i.e., when operating as a transmit antenna).

However, because of the substantial variability exhibited in the achieved permeability of ferrites in even high-quality manufacturing techniques, this approach requires that one or more of the ferrite loaded loops be constructed to provide current control of its effective area as previously described for other embodiments.

Two additional ferrite loaded loops can be appropriately spaced between the two outer RFI suppression probe ferrite loaded loops described immediately above. When properly spaced and positioned, these additional loops connected to add their outputs together are coupled to the other three loops in a manner sufficient to cancel the net coupling from the three RFI suppression probe loops. One or more of the added loops can be constructed as current controlled rod antennas, as described herein, to enable adjustment to counter manufacturing and assembly variations.

In a related embodiment, the number of outer ferrite rod antennas is increased; say to three, four or more; while a single central loop is used. The individual rod antennas being distributed at equal distances around a common center point where the single central rod antenna is located. Current control is applied to one or more of the rods to provide a means of adjusting for manufacturing and or environmental variations.

Likewise, the transmit probe can be constructed with more than two rod antennas distributed around the central rod antenna. The spacing from the center being used to position the transmit probe rod antennas into the null region between the inner rod antenna and the outer ring of rod antennas of the RFI suppression probe.

Note that the system discussed herein does not require the RFI to be in the form of a perfect plane wave to provide substantial suppression performance. The inventor has achieved good success in the presence of many obstructions and obstacles that no doubt created distortions and reflections and therefore created non-planar reflected waves. As long as the distance to the objects creating these waves is several times the maximum dimension of the probe, they are suppressed to a significant extent. Of course, the larger the probe (where larger refers to a greater effective sensing distance) the farther away such reflectors need to be so that the resulting reflected wave is adequately suppressed. In at least one instance the inventor encountered problems suppressing a particular AM-station signal because its source was either too close to the probe or the signal was sufficiently strong for its field to be easily distorted and thereby appear in the probe output. The AM signal was suppressed, but not completely. In such cases, adaptive techniques, such as described herein are essential to achieve the desired performance. Also, classic active cancelation circuits and signal processing techniques can be used in addition to the adaptive cancelation techniques described herein.

BRIEF DESCRIPTION OF THE DRAWINGS

The advantages and aspects of the described embodiments will be more fully understood in conjunction with the following detailed description and accompanying drawings, in which:

FIG. 2 illustrates a small auxiliary loop-based adjustment technique applied to a loop antenna;

DETAILED DESCRIPTION OF THE INVENTION

Figure 1:
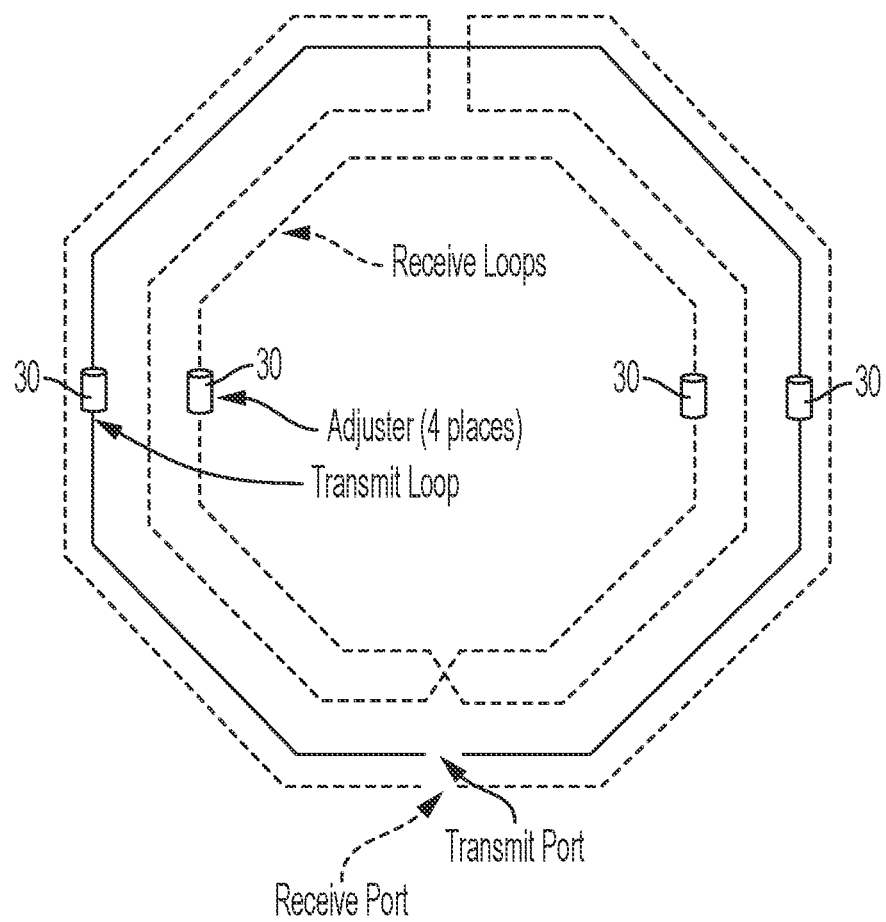
FIG. 1 illustrates an antenna configuration of loops as known in the prior art.

According to the prior art, the correct sizing of the probe loops was achieved by adding some type of mechanical adjustment mechanism, such as a turnbuckle, to one or more of the loops to permit adjusting the physical size of one or more of the loops. This approach, illustrated in FIG. 1 by the turnbuckles 30, while functional, requires a complicated movable mounting of each loop to permit loop adjustment and is substantially a one-time-only adjustment. While the turnbuckle can be manipulated at any time to change the loop size, this is generally not feasible while the system is in operation. This mechanical approach is akin to a calibration process, but without motors to control and adjust the turnbuckles, it is considered a static system between adjustment events.

The electronic adjustment approach makes it possible to adapt in near real-time to changes in the environment (such as heat causing the system to expand, or a vehicle crossing proximate the system and thereby changing the level of received interference). As can be appreciated from the description of the invention, these adjustments are necessary to both reduce RFI suppression, which may be the primary concern, and increase isolation between the transmit and receive antennas.

In one embodiment described herein and pictured in FIG. 2, three small adjustment loops 34A, 34B, and 34C (i.e., adjustment loops for reducing far-field RFI and increasing isolation) are added to a set of near-field probes or near-field loops (transmit and receive) to provide RFI suppression in the probe receiving loop while permitting conventional transmit performance by the probe transmitting loop.

The two outer loops 34A and 34C are electrically (physical conductors) connected to a receive antenna 40 (also referred to as receive multi-loops). The central loop 34B is electrically connected to a transmit antenna 42. In different embodiments the receive and transmit antennas can be reversed and each may comprise multiple loops or a single loop. For example, the transmit antenna 42, shown here as a single loop for clarity, could be a multi-turn assembly where the actual geometric relationship between the loops has no particular significance. In one embodiment, the transmit antenna 42 comprises three closely-spaced turns and the receive antenna 40 comprises one large outer loop and eight smaller inner loops.

The specific configuration of nested transmit and receive loops in FIG. 2 creates electrical isolation (magnetic decoupling) between the transmit and receive loops. The three adjustment loops 34A, 34B, and 34C (relatively small when compared to the probe transmit and receive loops) can each comprise one or more turns of a conductor, with the planes of the conductor turns oriented parallel to each other (as shown in the close-up view of FIG. 3) and normal to the planes of the two probe loops. This orthogonal orientation of the adjustment loops relative to the probe loops minimizes potentially adverse magnetic coupling between the adjustment loops and the probe loops. The adjustment loops 34A, 34B, and 34C provide an alternative adjustable decoupling technique to optimize isolation between the probe loops, and can be used in lieu of mechanical means, such as turnbuckles of FIG. 1.

Two of the relatively small adjustment loops (e.g., loops 34A and 34C of FIG. 3) are connected to one element of the probe (referred to as Circuit 1 and comprising either the probe transmit antenna or the probe receive antenna). The third adjustment loop (34B) is connected to the other element of the probe (referred to as Circuit 2 and comprising the probe receive antenna if Circuit 1 refers to the probe transmit antenna or comprising the probe transmit antenna if Circuit 1 refers to the probe receive antenna). Providing an adjustment mechanism for moving the third adjustment loop 34B, relative to the other two adjustment loops 34A and 34C, varies the coupling among the loops.

A field null is created between the two outer adjustment loops 34A and 34C (also referred to as Circuit 1) by connecting the loops to cause currents to flow in opposite clockwise directions in each of the two outer adjustment loops. This condition enables the relative position of the third adjustment loop 34B to be used as a means of controlling the overall magnetic coupling between Circuit 1 and Circuit 2.

In addition, the opposing condition of the applied currents in the two outer adjustment loops creates an electrical structure that is insensitive to far-field emanations impinging on the probe, which is consistent with the RFI suppression capabilities of the probe.

Figure 3A:
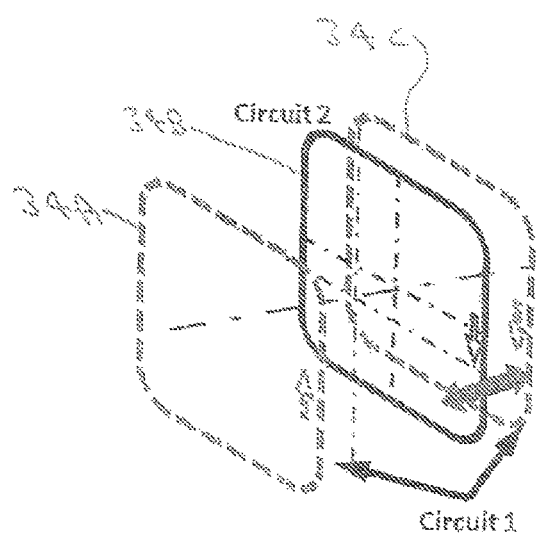
FIGS. 3A and 3B illustrate details of the small loop-based adjustment technique of FIG. 2.
Figure 3B:
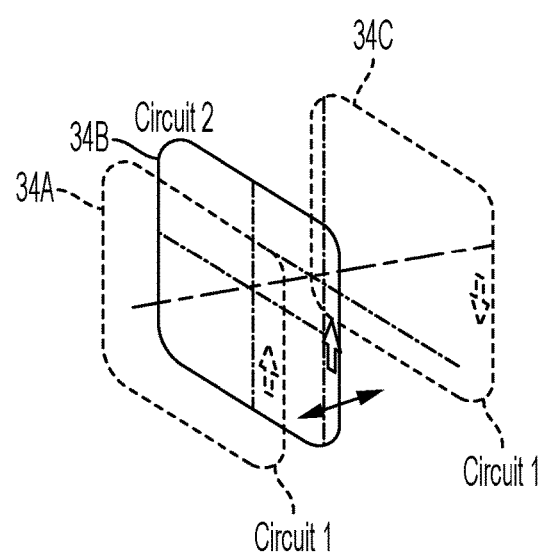

For example, FIG. 3A illustrates the center adjustment loop 34B positioned closer to the rightmost outer adjustment loop 34C, such that the induced current in the center loop has the same clockwise sense as the current in the loop 34C. FIG. 3B shows the center loop 34B closer to the loop on the left 34A such that the induced current in the center adjustment loop 34B is reversed, flowing in a counterclockwise sense.

In addition, the two outer loops 34A and 34C are connected to the probe receive loop in such a way that the current flow in the receive probe loop flows in the opposite clockwise direction to the current flow in each of the two smaller adjustment loops. The opposing current flow condition results in the cancellation of any induced currents due to the presence of far-field interference. Further, the smaller adjustment loops are oriented so that their planes are normal to the plane of the larger probe loops. In this way, they are magnetically decoupled from the larger probe loops. Any interaction between the adjustment loops and the probe loops would complicate the adjustment process.

Figure 4:
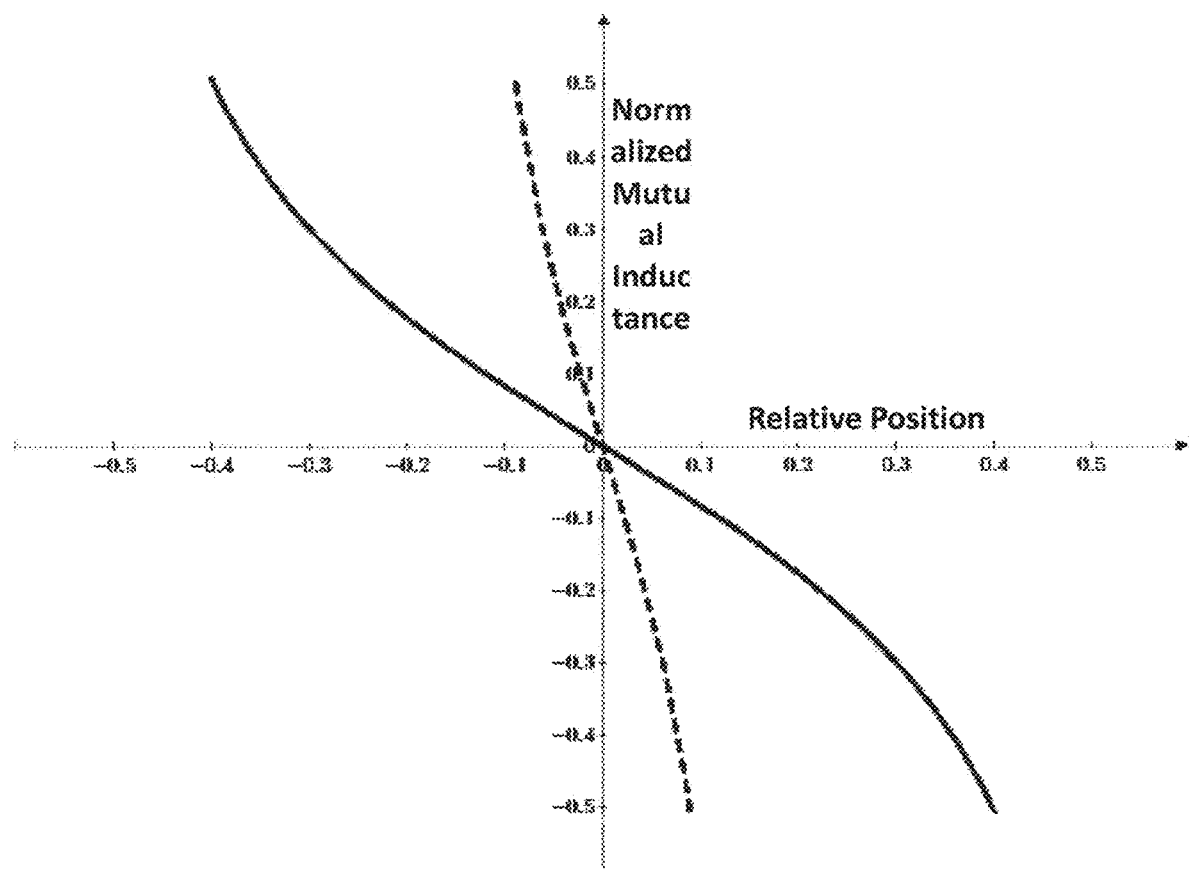
FIG. 4 plots the mutual inductance as a function of central loop position for two values of outer loop spacing.

The spacing between the two outer adjustment loops 34A and 34C determines the sensitivity to the movement of the center loop 34B between the two outer loops. That is, when the outer loops are closely spaced a small change in the position of the center loop relative the outer loops causes a larger change in mutual inductance than when the loops are spaced farther apart. In addition, the closer spacing results in a reduction of the maximum mutual inductance that can be achieved by moving the center loop. These effects are illustrated in FIG. 4 for two conditions of spacing between the outer loops, where the wider loop spacing is four times wider than the narrow spacing. The narrow spacing mutual inductance is plotted with a dashed line, while the wider spacing is plotted with a solid line. The X axis is the normalized position relative to the wider spacing between the two outer loops. The Y axis is mutual inductance normalized to the self-inductance of the central loop.

Properly adjusted, this coupling variation is used to counteract any residual coupling present between the larger probe loops. When the small adjustment loop 34B connected to Circuit 2 is moved nearer to one of the two small adjustment loops 34A and 34C of Circuit 1, current is induced in the inner small loop 34B in the direction of the nearest of the two outer small loops. In addition, the amount of current induced increases as the inner small loop is moved closer to either of the outer small adjustment loops. These two effects are used to adjust the total magnetic coupling between the two circuits, such as to minimize that coupling.

The implementation discussed above is not dependent upon the sizes or shape of the various loops 34A, 34B and 34C, e.g. round, square, rectangular, etc. However, making the two outer adjustment loops 34A and 34C the same shape and size creates a symmetry of the mutual coupling around a midpoint between the two loops. Specifically, a shape of the various loops is selected to fit other requirements, such as planned housings (enclosures) and the level of coupling tolerance to be accommodated. That is, the maximum mutual inductance to be achieved between these smaller loops by the movement of the central loop is made equal to the expected maximum variation of the mutual inductance of the larger probe loops as a result of tolerance errors.

Figure 5A:
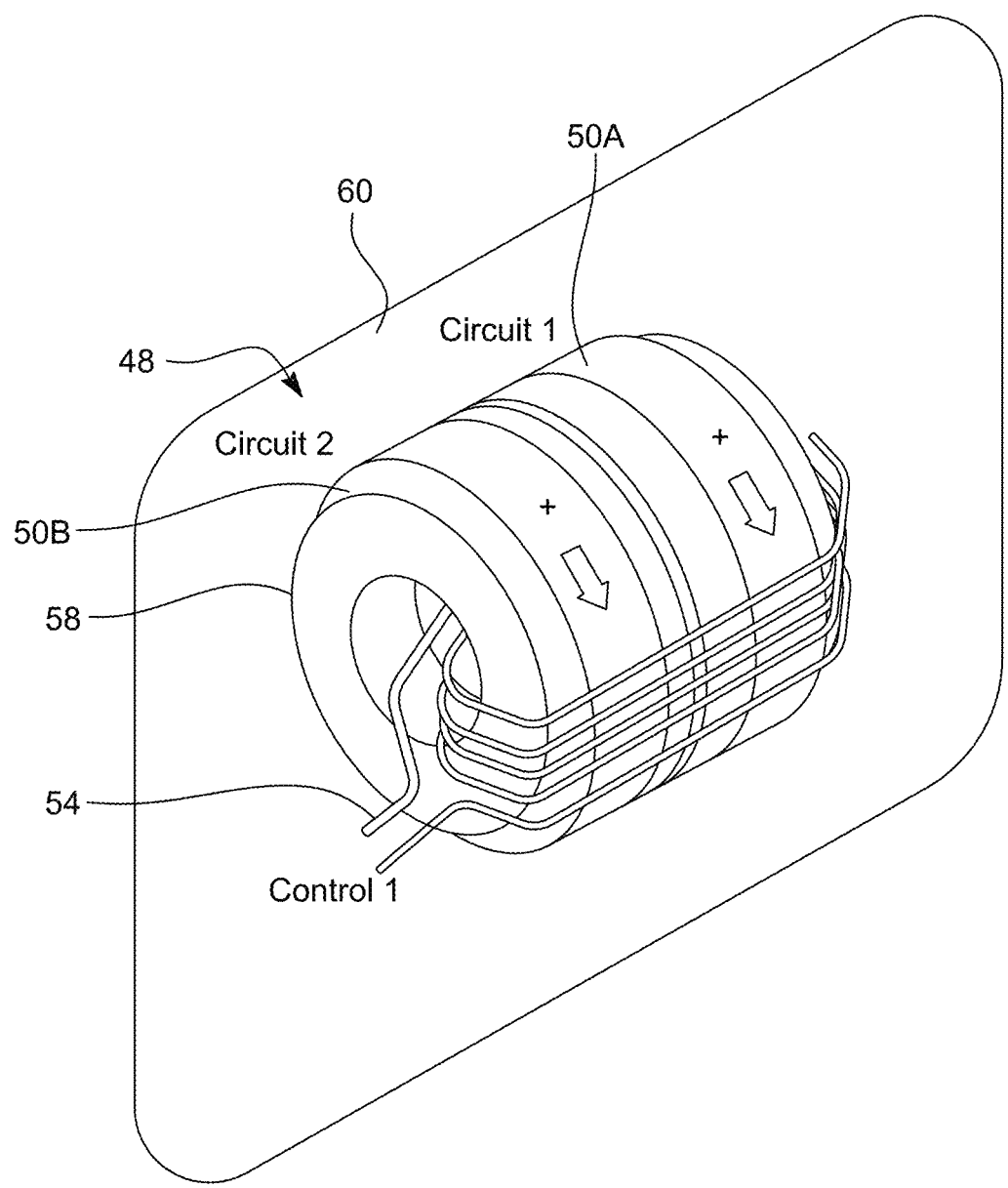
FIGS. 5A and 5B illustrate techniques for adjusting the coupling between ferrite rod loaded loops using a control winding.
Figure 5B:
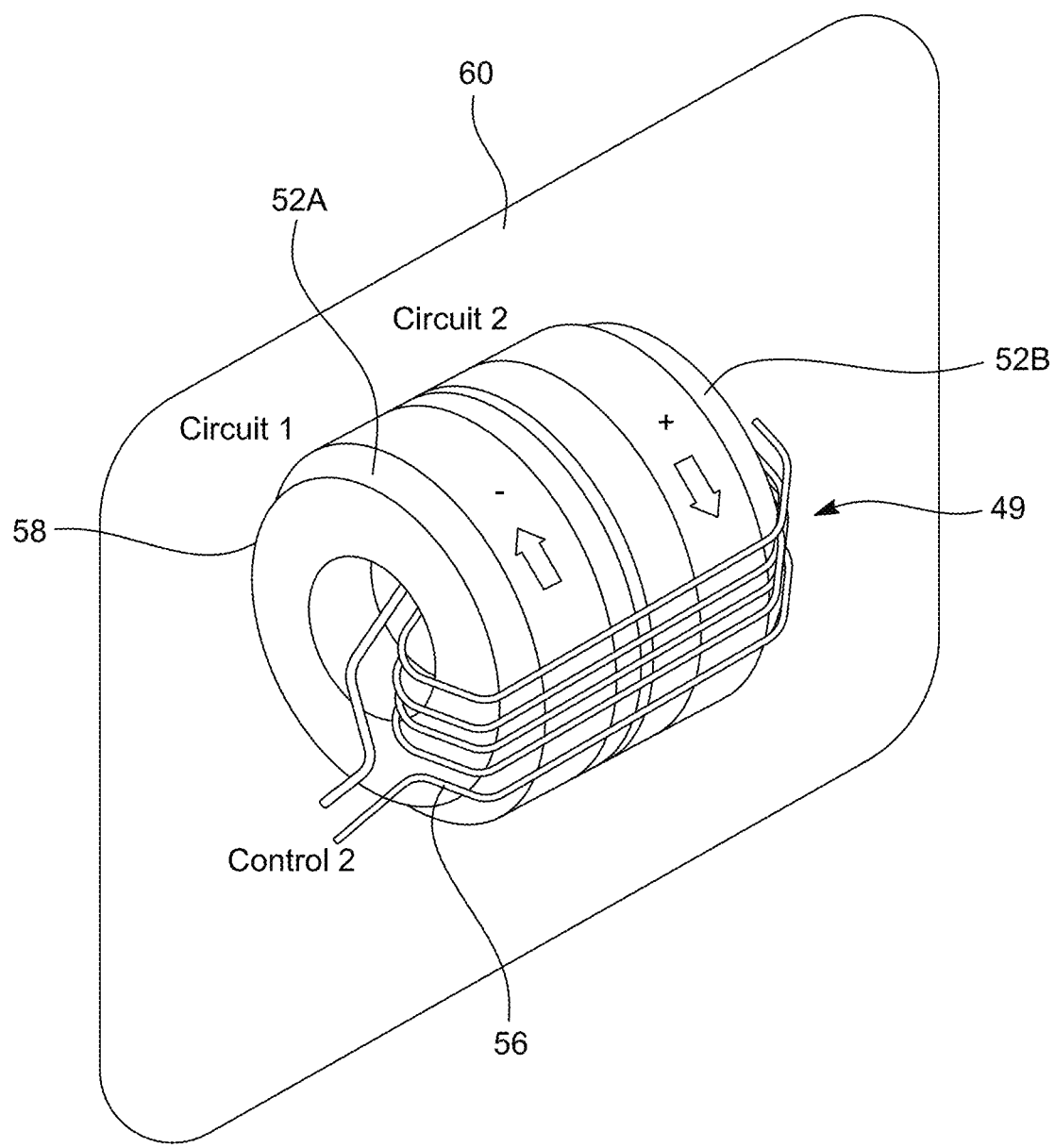

A second implementation or embodiment of adjustment mechanisms comprises two ferrite-loaded loop assemblies 48 and 49 as shown in FIGS. 5A and 5B, each further comprising three conductors wound around a ferrite rod in specific configurations are shown. In essence, the ferrite-loaded loop assemblies 48 and 49 represent a ferrite-loaded extension of the loops illustrated in FIGS. 3A and 3B.

The three loop assemblies represent a first circuit, a second circuit, and a control circuit. The first two circuits 50A and 50B (FIG. 5A) and 52A and 52B (FIG. 5B) are formed by winding one or more turns of a conductor around a circumference of a ferrite rod core 58. The control circuits 54 (FIG. 5A) and 56 (FIG. 5B) are wound normal to the first two circuits 50A/50B and 52A/52B and pass through an axial hole defined in the rod 58.

A plane 60 of the probe (i.e., the transmit and receive antennas) is also indicated in FIGS. 5A and 5B.

In FIG. 5A current flow in the circuits 50A and 50B are in the same direction. In FIG. 5B currents flow in opposite directions through the circuits 52A and 52B. See arrowheads on the circuits in FIGS. 5A and 5B.

Figure 6:
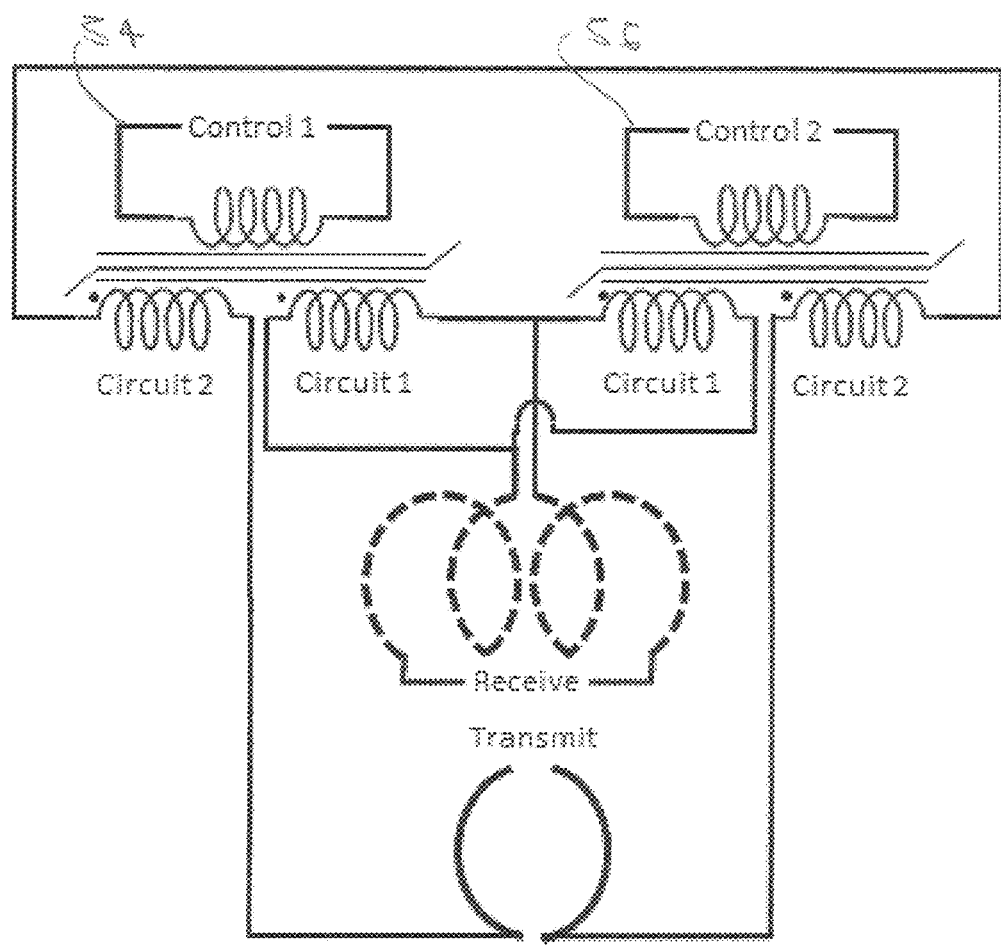
FIG. 6 shows a schematic of the connection of two ferrite rod loaded loops to emulate the adjustment provided by the small loop adjustment scheme.

Note in FIGS. 5A and 5B the windings of the first and second circuits 50A/50B and 52A/52B are depicted as conductive bands rather than individual turns of wire. In fact, either multiple turns of wire or a conductive band can be used for the circumferential windings, where the preferred choice depends on the number of turns required to achieve the desired mutual A schematic of the two ferrite rod loaded loops (that also emulate the adjustment provided by the small loop adjustment scheme described above in conjunction with FIGS. 2 and 3), is shown in FIG. 6, with the assembly of FIG. 5A on the left of FIG. 6, and the assembly FIG. 5B on the right of FIG. 6. When a control current is supplied to control winding 1 (reference numeral 54) but not to control winding 2 (reference numeral 56), the net RF current coupled from Circuit 1 into Circuit 2 flows in a first direction. Current flows in a second opposite direction when current is applied to control winding 2 (reference numeral 56), but not to control winding 1 (reference numeral 54). When the sense and magnitude of the coupled current is selected to equal any residual current resulting from coupling between the transmit portion of the probe and the receive portion, the result is a minimization of current due to coupling between the transmit portion of the probe and the receive portion of the probe.

The rods 58 may be fabricated as a single cylindrical structure or from a stack of annular cores that are secured in a manner such as to create a core of the desired shape, such as the exemplary core 58 of FIGS. 5A and 5B. Other cross-sectional shapes, such as square could be used, but round rods and annular cores are more readily available in the commercial marketplace. A length of the rod is selected to be consistent with the expected variation in coupling between the two circuits chosen for the desired application. Analytic and empirical methods may be used to make this selection.

In the embodiments described above, the ferrite rods and associated windings operate as voltage variable inductive couplers. In contrast, the ferrite rod illustrated in FIG. 7 and described below forms an adjustable auxiliary rod antenna to vary the effective area of the probe loop (transmit or receive) into which it is inserted.

Figure 7:
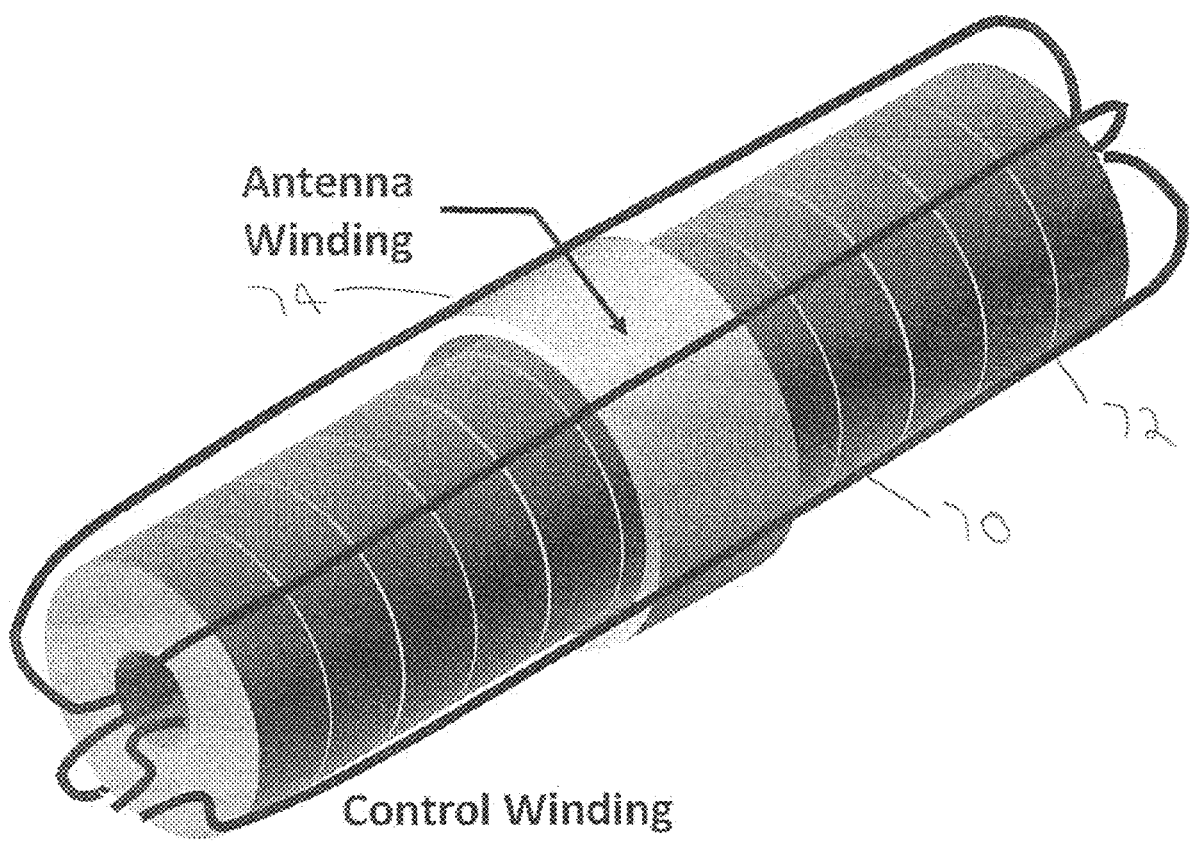
FIG. 7 illustrates a ferrite rod with a control winding for providing current control of the effective size of the ferrite rod antenna.

With reference to FIG. 7, a control winding 72 is wound through an axial hole passing through the ferrite rod 70, while an antenna circuit winding 74 is placed around the rod at a right angle to the control winding 72. This unique configuration results in isolation between the annular (also referred to as circumferential) circuit and the control circuit. It also enables easy control of the rod's permeability because the control flux (i.e., as created by the control winding 72) flows in a short, closed path through the ferrite rod 70. Therefore, the applied current creates a significant field, which requires only a modest current to be applied to drive the ferrite rod 70 into its non-linear saturation region of operation.

The FIG. 7 embodiment thus forms a type of antenna. That is, the presence of an incident field induces voltage in the windings on the rod, as is the case with any antenna. The presence of the ferrite rod increases the effective area or aperture of the coil. This increase is dependent on the cross-sectional area, the length and the permeability of the rod. Normally, the intention is to achieve as great an area enhancement as possible, given specific volume limitations. However, as applied in this application, it is useful to be able to adjust the enhancement effect when used in conjunction with the much larger un-loaded, air-core loops that make up the probe.

When saturated, the effective permeability of the rod 70 is significantly reduced. While the control current can easily effect a change in the permeability, the flux generated by the circumferential windings has little or no effect on the rod's material properties as the reluctance of the magnetic circuit along the rod is much higher. That is, the effective permeability of the annular circuit is much lower than that of the control path. However, the change in permeability caused by the control circuit does affect the annular circuit's effective area, and thereby the total area of the air-cored loop into which it is connected.

It is assumed that a size of the various loaded ferrite rod antennas described herein is small relative to the overall size of the probe, (i.e., the transmit and receive loops) thus the effect is fairly small. Specifically, the size of the loaded rods is determined to be just sufficient to enable adequate control to overcome any ill effects resulting from manufacturing tolerances and other likely environmental variations.

Figure 8:
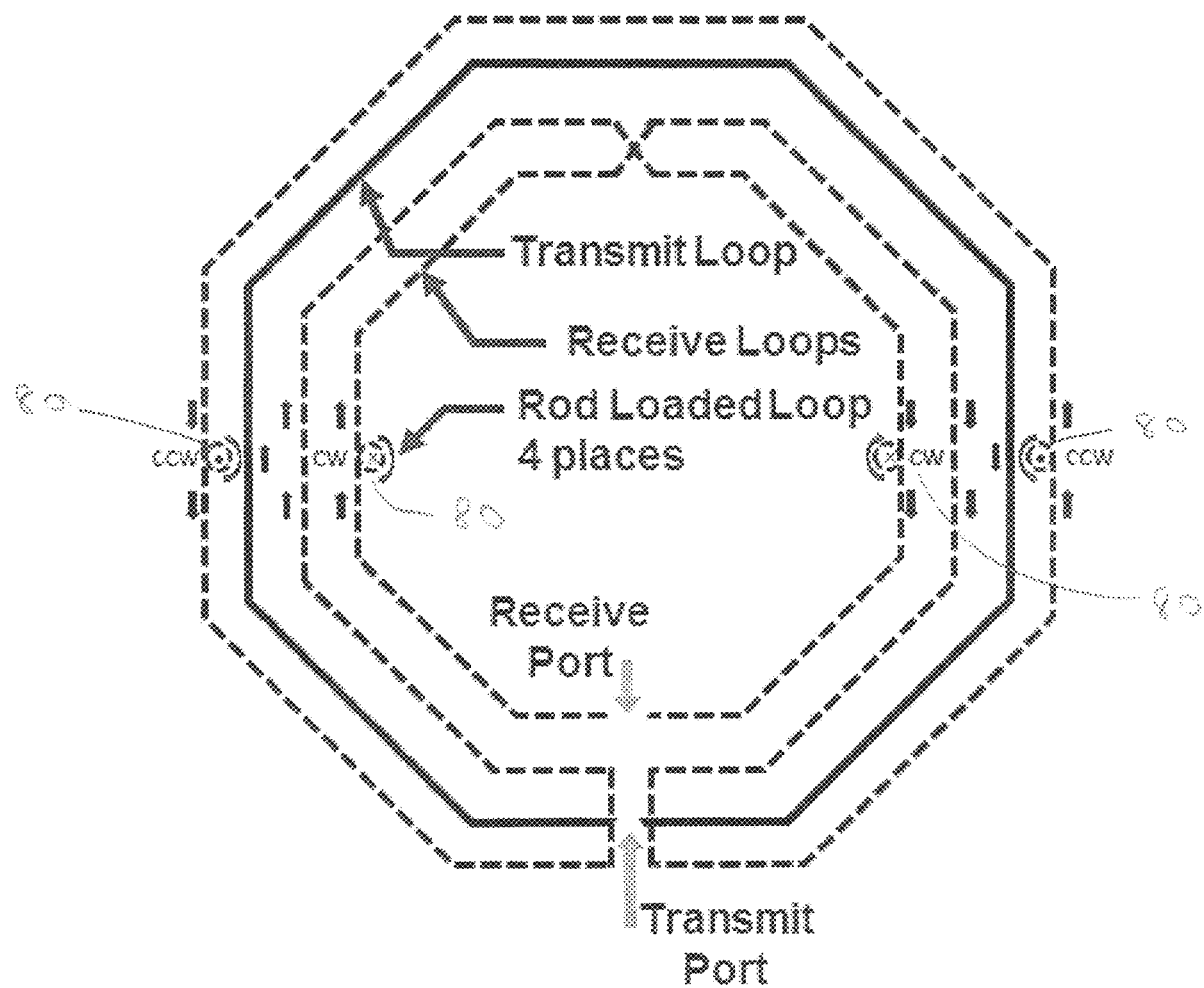
FIG. 8 shows a technique using four ferrite rod loaded loops to control both the RFI suppression and intra-probe coupling between the transmit and receive loops.

One such implementation of the FIG. 7 rod-based antennas is shown in FIG. 8. Four small ferrite rod loaded loops 80 are shown as incorporated into the RFI suppression portion of the probe to provide a means of adjusting the effective area of two of the probe loops. This implementation offers two degrees of freedom in adjusting the response of the total probe to its environment. That is, if currents, equal or unequal, but not zero, are applied to the control windings (e.g., 72 of FIG. 7) in both sets of the ferrite rod loaded loops, the effective sizes (areas) of the probe loops are decreased due to the reduction in the effective permeability of the ferrite material. Since the rod loaded loops 80 are applied to only the set of loops of the probe that support RFI suppression, the effect of reducing the size of this set of loops acts to change the relative area of that portion of the RFI suppressing probe relative to the transmit loop.

This change in effective areas (sizes) changes the coupling between the two sets of probe loops. That is, the coupling between transmit and receive loops of the probe is modified. By measuring the output of one, say the receive loop, while exciting the other, say the transmit loop, the control current into the ferrite rods can be adjusted to minimize the output, thereby minimizing the coupling between the transmit and receive loops. With proper sizing of the various components, it is expected that a coupling factor reduction of greater than about 50 dB can be achieved. That is, for an input of zero dBm into the transmit portion, the output of the receive portion is less than −50 dBm.

Applying a greater current to the control windings of one loop's ferrite rod(s) relative to the control windings of the ferrite rod(s) in the other loop, alters the relative effective size of the loops. Since the ratio of the sizes of the two loops determines the difference of the summed current from the total receive probe, this technique is used to affect a reduction of the response from the probe to any far-field sourced energy (RFI) present in the environment. Thus, adjusting the control currents in response to the magnitude of the measured summed response from the total probe results in a method of minimizing the overall response of the probe to far-field sourced energy.

Figure 9:
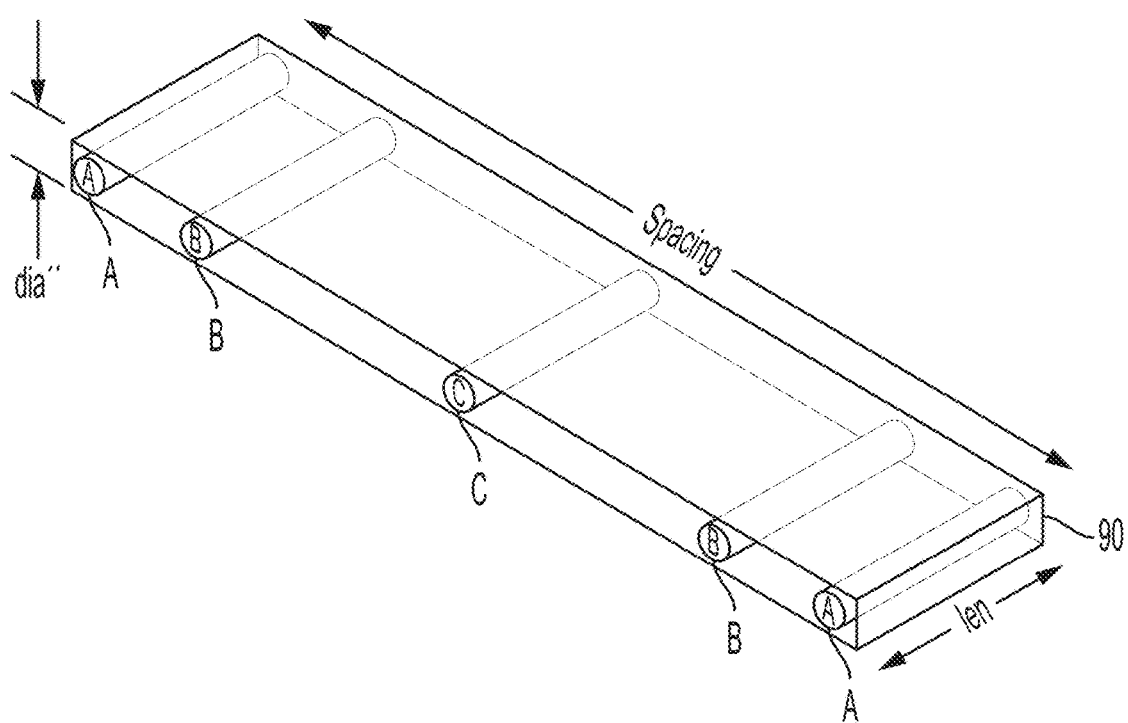
FIG. 9 illustrates a configuration of ferrite loaded rod antennas comprising both an RFI suppressing probe and an isolated transmitting probe.

The probe configuration illustrated in FIG. 9 uses five ferrite-rod loaded loop antennas (A A B B C) (and only generally depicted in FIG. 9) in place of the air-core probe loops described above, to create an RFI suppressing receive probe with a collocated isolated transmit probe. Each of the rods comprises a current-controlled ferrite rod antenna. The three rods labeled A, C, A in FIG. 9 form the receive probe, with RFI suppression characteristics, and the rods B-B form the transmit part of the probe. The ferrite rods in this embodiment are only dimensionally different from those described above. Because it is intended that the rod antennas act in place of the previously depicted air-core loops, it is necessary they provide much greater effective areas than those rod-based components described above. The previously described units are used to compensate for small errors in materials and tolerances. Since the effective area is dependent upon the length of the rod, in addition to other factors, the ferrite rods of FIG. 9 are larger, possibly constructed by stacking a large number of toroidal cores together to achieve the desired length. Placing a number of turns of a conductor at the midpoint of the rod also increases its effective diameter. However, an optimum length to diameter ratio exists for a given rod geometry to maximize the effective area, relative to the overall volume of the antenna.

In FIG. 9 the five rods A B C B A are disposed on a substrate 90. In another embodiment the five rods are disposed in a housing or enclosure.

In general, it is necessary to construct the two outer rod antennas (A and A in FIG. 9) to each have $1/(N-1)$ times the effective area of the central rod antenna (C in FIG. 9), where N is the number of rods making up the complete RFI suppression probe. That is, for a probe made up of three rod antennas, the outer rod antennas are made to have one-half of the effective area of the central rod antenna, one-third with four rods, one-quarter with five rods, etc.

The near-field performance is determined by the spacing between the two outer rod antennas. It is improved as the spacing is increased, however, the RFI rejection decreases as the spacing is increased. Assuming the output of the sum of two outer two antennas is exactly equal to that of the central antenna, the worst case RFI suppression is determined by the following equation:

$$\text{Suppression} = 1 - 2 * \cos\left(\frac{\pi * \text{Spacing}}{\text{wavelength}}\right) \quad \text{(Eq 1)}$$

The effective area for ferrite rod antenna is proportional to the product of the effective permeability of the ferrite rod times its cross-sectional area times the number of turns of conductor applied to the antenna. However, the rod's effective permeability is determined by a number of geometric factors as well as the ferrite's relative permeability, such as its length and diameter and those of the conductor winding applied to it. Fabricating the rod antennas such that the number of turns on the appropriate rods matches the desired effective area ratios provides a reasonably close match to the desired effective area of each rod antenna. That is, for a ratio of 2:1 for a three-rod probe, the two outer rod antennas are built with one-half as many turns as used on the central rod antenna. Using the same ferrite material and rod dimensions for the rods and winding the applied conductors to have the same overall dimensions yields a reasonable method of assuring the correct effective areas for each rod antenna. However, an exact match cannot be assured by this method. Empirical testing provides a means to better match the antennas' performances. However, the use of a control winding in each of the five ferrite rod antenna of FIG. 9 is preferable to achieve optimum far-field (RFI) suppression characteristics.

In addition, the near-field performance of the complete set of loops is dependent on the spacing between the outer rod antennas (A and A). The greater the spacing, the greater the sensitivity of the central rod antenna (C) to nearby signals, that is, those from targeted materials. However, as illustrated by Eq. (1), the RFI suppression is inversely proportional to this spacing. Therefore, an optimum spacing exists based on the desired sensitivity of the set of antennas relative to sensitivity of the receiver and the desired RFI rejection capabilities.

To enable adjustment of the relative responses of the individual loops such that their far-field outputs net to a minimum, one or more of the rod antennas of FIG. 9 are provided with a control winding through the longitudinal hole through the rods, such as illustrated in FIG. 7. Current flow through the control winding controls the effective permeability of the rod and thereby the effective area of the controlled antenna. A feedback loop which measures the residual RFI, in the absence of a desired signal, is provided to maximize the RF suppression in the probe.

It is possible to apply control windings to all the rods used to form an RFI suppressing antenna. However, to simplify the control circuitry required, it is assumed that some analytic and empirical efforts to adjust the coil's form factor or number of turns are used to achieve a sufficiently matched set of these RFI suppressing rod antennas such that control can be achieved by applying the control circuitry to a single rod antenna in the set. This is most likely the central rod antenna, but could be another rod antenna in the set.

Two additional ferrite loaded loops (the B B rods of FIG. 9) spaced appropriately between the two outer RFI suppression probe ferrite loaded loops constitute an isolated transmit antenna of the probe. When properly spaced and positioned and the feed points of the additional loops connected to add their inputs together, they are decoupled from the other three loops. Specifically, a null region exists between the inner and outermost RFI suppression rod antennas, such that another rod antenna placed in this region does not couple to the complete receive probe. One or more of the added loops are constructed as current controlled rod antennas to enable adjustment to counter manufacturing and assembly variations.

In an additional embodiment, the number of outer ferrite rod antennas are increased; say to three, four or more; while a single central loop is used. The individual rod antennas being distributed at equal distances around a common center point where the single central rod antenna is located. Again, the effective area of the sum of the outer loops is set equal to that of the single inner ferrite rod antenna. In a similar manner, the outputs of the outer loops are summed and connected in opposition to the inner ferrite rod antenna to form an RFI suppressing probe configuration. Current control is applied to one or more of the rods to provide a means of adjusting for manufacturing and or environmental variations.

Likewise, the transmit probe can be constructed with more than two rod antennas distributed around the central rod antenna. The spacing from the center being used to position the transmit probe rod antennas into the null region between the inner rod antenna and the outer ring of rod antennas of the RFI suppression probe.

What is claimed is:
1. A sensor probe comprising:
a first antenna;
a second antenna;
a first variable magnetic coupler comprising:
  a ferrite rod;
  a first circuit conductor wound around the circumference of the ferrite rod;
  a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
a second variable magnetic coupler comprising:
  a ferrite rod;
  a first circuit conductor wound around the circumference of the ferrite rod;
  a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
the first circuit conductor of each of the first and second variable magnetic couplers connected to the second antenna and the second circuit conductor of each of the first and second variable magnetic couplers connected to the first antenna; and a control current supplied to the control winding of one or both of the first and second variable magnetic couplers to control coupling between the first and second circuit conductors of each of the first and second variable magnetic couplers and thereby control coupling between the first and second antennas.

2. The variable magnetic coupler of claim 1, wherein each of the first and second circuit conductors of the first variable magnetic coupler, and each of the first and second circuit conductors of the second variable magnetic coupler comprises a conductive band or multiple turns of wire.

3. The variable magnetic coupler of claim 1, wherein the ferrite rod of the first variable magnetic coupler and the ferrite rod of the second variable magnetic coupler each comprises a solid cylindrical rod, a stack of annular cores, or a rod having a non-circular cross-section.

4. The sensor probe of claim 1, wherein the first antenna comprises a transmit antenna and the second antenna comprises a receive antenna, or wherein the first antenna comprises a first receive antenna and the second antenna comprises a second receive antenna, or wherein the first antenna comprises a first transmit antenna and the second antenna comprises a second transmit antenna.

5. The sensor probe of claim 1, wherein each one of the first and second antennas comprises a loop antenna.

6. The first and second variable magnetic couplers of claim 1, each one operating as a voltage-controlled variable inductive coupler.

7. The first and second variable magnetic couplers of claim 1, wherein the control winding of each comprises a plurality of winding turns.

8. A sensor probe comprising:
a first antenna;
a second antenna;
a first variable magnetic coupler comprising:
a ferrite rod;
a first circuit conductor wound around the circumference of the ferrite rod;
a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
a second variable magnetic coupler comprising:
a ferrite rod;
a first circuit conductor wound around the circumference of the ferrite rod;
a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
a third variable magnetic coupler comprising:
a ferrite rod;
a first circuit conductor wound around the circumference of the ferrite rod;
a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
a fourth variable magnetic coupler comprising:
a ferrite rod;
a first circuit conductor wound around the circumference of the ferrite rod;
a second circuit conductor wound around the circumference of the ferrite rod; and
a control winding disposed normal to the first and second circuit conductors and passing through an axial opening in the ferrite rod, wherein a current applied to the control winding changes an effective permeability of the ferrite rod, such that magnetic coupling between the first and second circuit conductors is altered;
the first circuit conductor of each of the first and second variable magnetic couplers connected to the second antenna and the second circuit conductor of each of the first and second variable magnetic couplers connected to the first antenna;
the first circuit conductor of each of the third and fourth variable magnetic couplers connected to the second antenna and the second circuit conductor of each of the third and fourth variable magnetic couplers connected to the first antenna;
a first control current supplied to the control winding of one or both of the first and second variable magnetic couplers to control coupling between the first and second circuit conductors of each of the first and second variable magnetic couplers and thereby control coupling between the first and second antennas; and
a second control current supplied to the control winding of one or both of the third and fourth variable magnetic couplers to control coupling between the first and second circuit conductors of each of the third and fourth variable magnetic couplers and thereby control RFI suppression of the sensor probe.

9. A nuclear quadruple resonance detection system or a RFID system comprising the sensor probe of claim 8.

10. The sensor probe of claim 8, wherein current flows in a same direction through the first and second circuit conductors of the first variable magnetic coupler and current flows in opposite directions through the first and second circuit conductors of the second variable magnetic coupler.

11. A sensor probe comprising:
a first variable ferrite rod antenna comprising:
a ferrite rod;
a circumferential antenna winding conductor; and
a control winding disposed normal to the circumferential antenna winding conductor and passing within an axial opening in the ferrite rod such that an applied control current effects a change in the effective permeability of the ferrite rod and thereby alters the effective area of the circumferential antenna winding conductor;
a second variable ferrite rod antenna comprising:
a ferrite rod;
a circumferential antenna winding conductor; and
a control winding disposed normal to the circumferential antenna winding conductor and passing within an axial opening in the ferrite rod such that an applied control current effects a change in the effective permeability of the ferrite rod and thereby alters the effective area of the circumferential antenna winding conductor;

a third variable ferrite rod antenna comprising:
   a ferrite rod;
   a circumferential antenna winding conductor; and
   a control winding disposed normal to the circumferential antenna winding conductor and passing within an axial opening in the ferrite rod such that an applied control current effects a change in the effective permeability of the ferrite rod and thereby alters the effective area of the circumferential antenna winding conductor;

the third variable ferrite rod antenna disposed between the first and second variable ferrite rod antennas; and
   a sum of the effective areas of the first and second variable ferrite rod antennas substantially equal to an effective area of the third variable ferrite rod antenna and a voltage induced in the first and second variable ferrite rod antennas opposing a voltage induced in the third variable ferrite rod antenna.

12. The sensor probe of claim 11, wherein the circumferential antenna winding conductor of each of the first, second, and third variable ferrite rod antennas comprises a conductive band or multiple turns of wire.

13. The sensor probe of claim 11, wherein the ferrite rod of each of the first, second, and third variable ferrite rod antennas comprises a solid cylindrical rod, a stack of annular cores, or a rod having a non-circular cross-section.

14. A nuclear quadruple resonance detection system or a RFID system comprising the sensor probe of claim 11.

15. The sensor probe of claim 11 further comprising a
a fourth variable ferrite rod antenna comprising:
   a ferrite rod;
   a circumferential antenna winding conductor; and
   a control winding disposed normal to the circumferential antenna winding conductor and passing within an axial opening in the ferrite rod such that an applied control current effects a change in the effective permeability of the ferrite rod and thereby alters the effective area of the circumferential antenna winding conductor;

a fifth variable ferrite rod antenna comprising:
   a ferrite rod;
   a circumferential antenna winding conductor; and
   a control winding disposed normal to the circumferential antenna winding conductor and passing within an axial opening in the ferrite rod such that an applied control current effects a change in the effective permeability of the ferrite rod and thereby alters the effective area of the circumferential antenna winding conductor;

the third variable ferrite rod antenna disposed between the first and second variable ferrite rod antennas; and
   a sum of the effective areas of the first and second variable ferrite rod antennas substantially equal to an effective area of the third variable ferrite rod antenna and a voltage induced in the first and second variable ferrite rod antennas opposing a voltage induced in the third variable ferrite rod antenna; and the fourth variable ferrite rod antenna disposed between the first and second variable ferrite rod antennas and the fifth variable ferrite rod antenna disposed between the second and third variable ferrite rod antennas.

16. The sensor probe of claim 15, wherein the first, second and third variable ferrite rod antennas form a probe receiving antenna and the fourth and fifth variable ferrite rod antenna form a probe transmitting antenna.

17. The sensor probe of claim 15, wherein the first, second, third, fourth, and fifth variable ferrite rod antennas are disposed on a substrate or within a housing such as to fix the geometric relationship between the first, second, third, fourth and fifth variable ferrite rod antennas.

18. The sensor probe of claim 11, wherein the control winding of each one of the first, second, and third variable ferrite rod antennas comprises a plurality of winding turns.

\* \* \* \* \*